April 1, 1924.
A. L. POWELL
1,489,005
INTERNAL COMBUSTION ENGINE
Filed Feb. 2, 1921
3 Sheets-Sheet 2
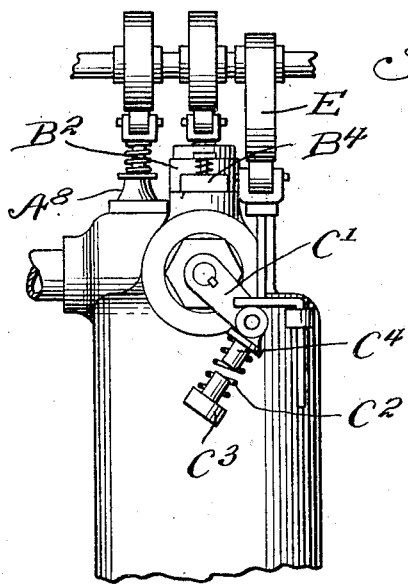
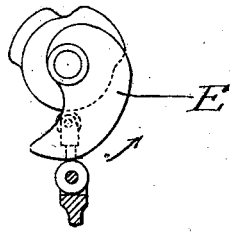
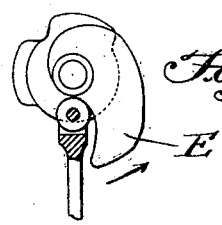
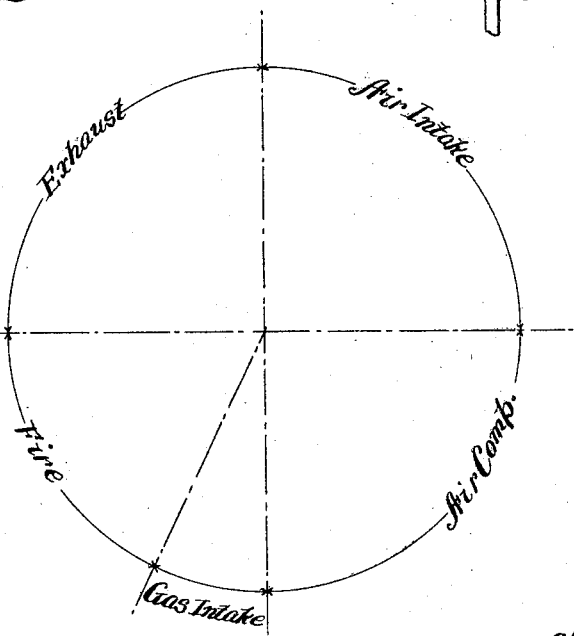
Inventor
Alvah L. Powell April 1, 1924.
A. L. POWELL
1,489,005
INTERNAL COMBUSTION ENGINE
Filed Feb. 2, 1921
3 Sheets-Sheet 3
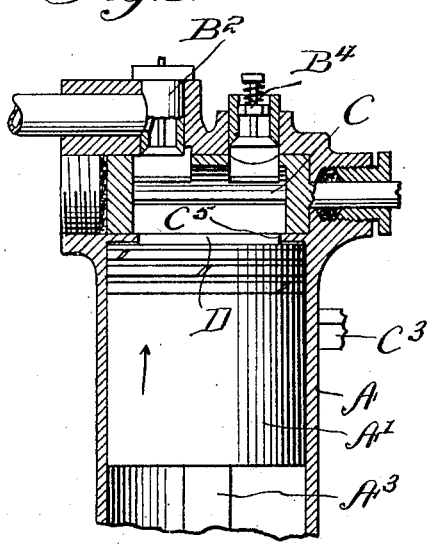
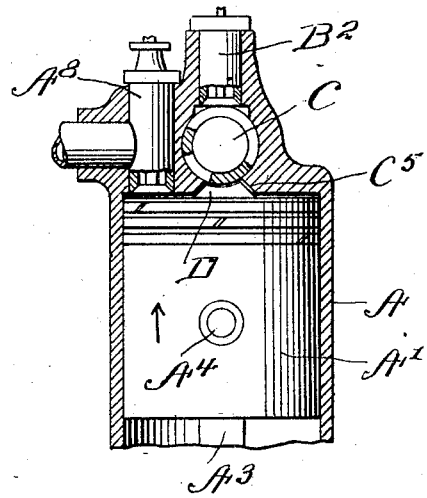
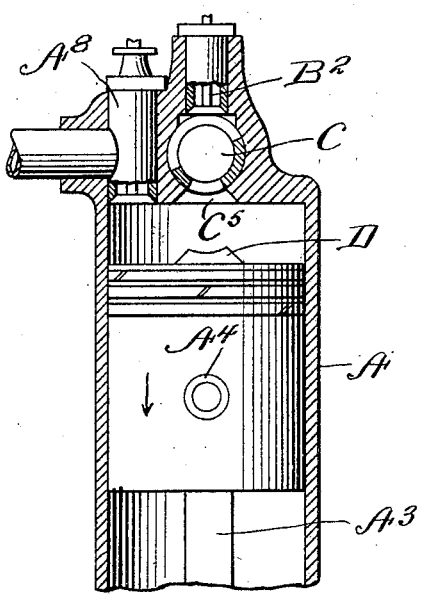
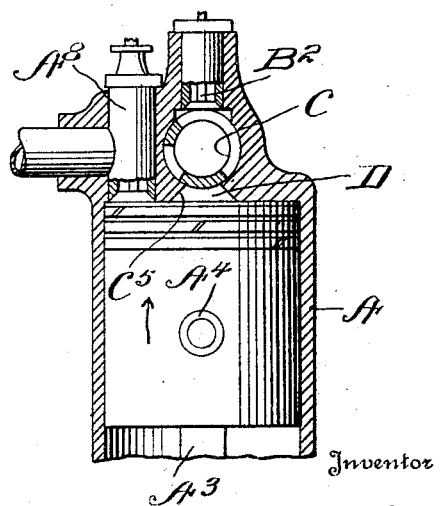
Inventor
Alvah L. Powell Patented Apr. 1, 1924.

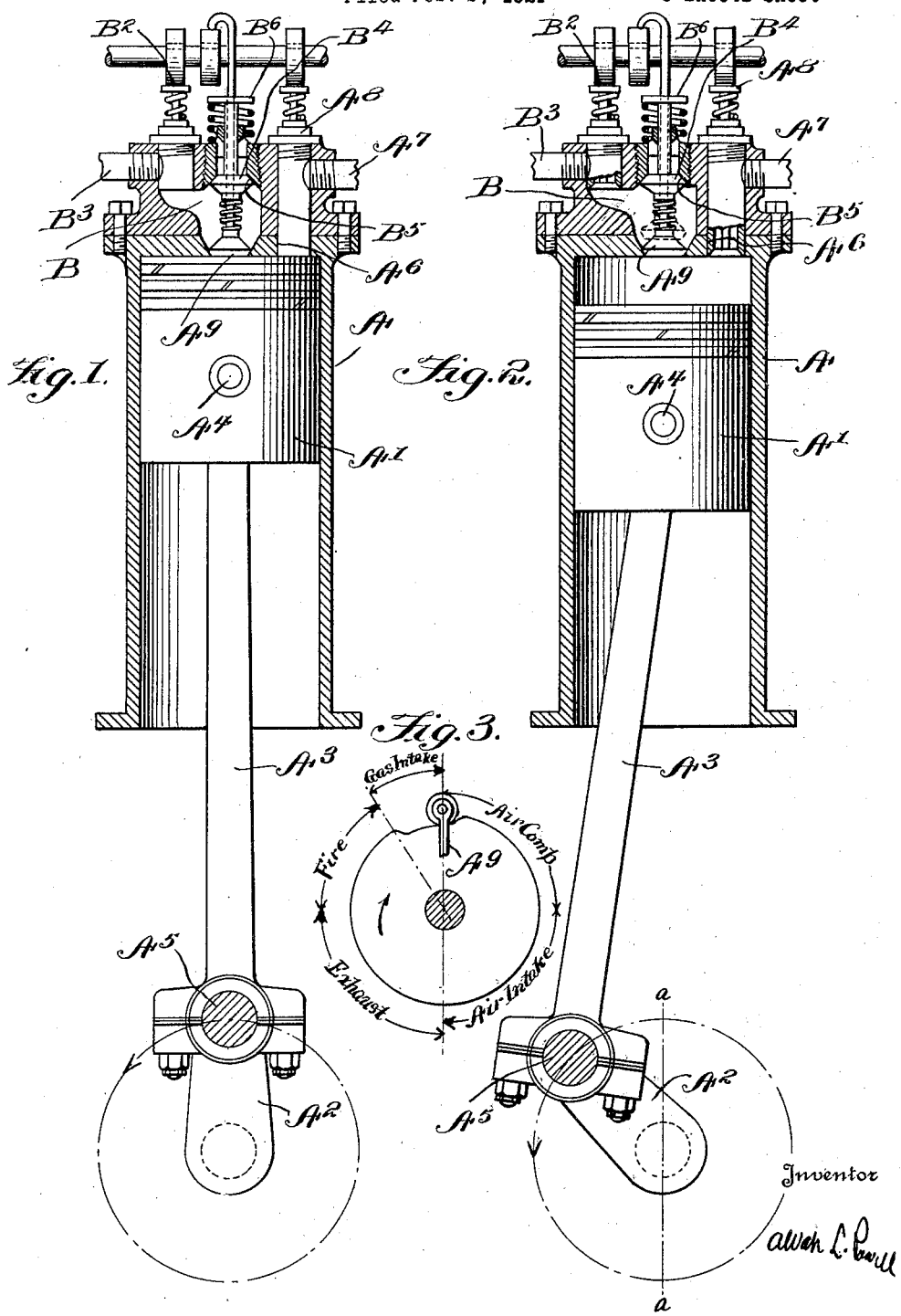

1,489,005

UNITED STATES PATENT OFFICE.

ALVAH L. POWELL, OF MILES CITY, MONTANA, ASSIGNOR TO THE A. L. POWELL POWER CO., INC., OF MILES CITY, MONTANA, A BODY CORPORATE.

INTERNAL-COMBUSTION ENGINE.

Application filed February 2, 1921. Serial No. 441,966.

*To all whom it may concern:*

Be it known that I, ALVAH L. POWELL, a citizen of the United States, residing at Miles City, in the county of Custer and State of Montana, have invented certain new and useful Improvements in Internal-Combustion Engines, of which the following is a specification.

My invention relates to improvements in internal combustion engines in which I change from the usual method of combining the fuel, or carburetor charge, with the air charge. The general practice has been to unite the fuel and air as they pass into the cylinder. In the Diesel engine, the fuel charge enters independently of the air, burning as it comes in contact with a previously highly compressed volume of air. In the improvement I have made I cause the air and gas to be introduced separately, the air being compressed to ignition temperature in a separate chamber that opens at a proper time, the fuel then being consumed. Increased temperature follows and results in power at the crank shaft.

In the accompanying drawings I show a form of my improvement, in which Figs. 1 and 2 are vertical sections, showing the related parts.

Fig. 3 is a diagram of the cam action.

Figs. 4, 8, 9, 10, 11 show a modification of my improvement.

Figs. 5 and 7 show a cam detail in the modification.

Fig. 6 is a diagram of a cycle, when operating the modification.

In Fig. 1 a cylinder A and piston $A^1$ of an internal combustion engine are shown, this engine being assumed to be of the four cycle type. Piston A is connected to a crank $A^2$ by a connecting rod, $A^3$, the wrist pins $A^4$, $A^5$, being used as in conventional construction. In the head of A there is located an opening into a passage $A^6$ that communicates with a fuel inlet pipe $A^7$ and an inlet valve, $A^8$, for admission of gas. In the same head there is a valve seat on which rests a valve $A^9$. When the valve $A^9$ is in the position shown in Fig. 1 the chamber B is closed. Valve $A^9$ is operable, as shown in Fig. 3. In the chamber B there is also an operable valve, $B^2$, which controls the exhaust through pipe $B^3$, Figs. 1 and 2.

On the stem of the operable valve $A^9$ there is fitted a check valve, $B^4$, slidable on said stem and normally seating on the valve seat, $B^5$. This valve governs the air inlet, as hereinafter to be described.

The operation of the engine is as follows:

On the down stroke of piston $A^1$ the valve $A^9$ is in the unseated position as shown in Figure 2 by dotted lines. The piston suction causes the check valve $B^4$ to open and a charge of air to be drawn in. On the return of piston this air is compressed into the chamber B. Piston $A^1$ moves upward until there is only clearance space between it and cylinder head, and practically all the previously indrawn air is forced into B. The check valve $B^4$ has resumed its seat through the action of the spring $B^6$. At end of this stroke, operable valve $A^9$ closes, the compressed air being, as a consequence, trapped in B. On the next downstroke of piston a suction effect is again produced under the conditions described. Operable valve $A^8$, Figs. 1, 2, opens, admitting a charge of gas from a carburetor or a fluid charge of fuel from any source. This suction effect continues until the piston has reached a point substantially as shown in Fig. 2, where valve $A^8$ closes. It will be noted that in the meantime the engine crank has advanced to a point on the crank circle of approximately forty five degrees from the center line *a—a*, Fig. 2. The operable valve $A^9$ now opens and the highly compressed air from chamber B comes in contact with the firing mixture already in the combustion chamber. Ignition takes place and power is developed for the balance of the stroke. As will be observed from Fig. 2, the part of stroke during which power is applied to engine shaft is that of greatest mechanical efficiency.

The cam diagram in Fig. 3 shows, in detail, the division of operations of the cams during a cycle, and the position of the cam controlling valve $A^9$ with reference to gas intake.

In Figs. 4, 5, 6, 7, 8, 9, 10, 11, I show a modification of my improvement. In this I replace valve $A^9$, hereinbefore described, by a rotary, oscillating valve, C, shown in the respective views. This valve is cored, having ports in its circumference one of which communicates with a valve $B^4$, through which air may be drawn to the cylinder, as will be described. The valve C is operated by a crank, C¹, pivoted, preferably, on the engine, and it is held against the surface of a cam by a spring, C², Fig. 4. This spring fits on a lug, C³, on cylinder and a lug, C⁴, on end of crank C¹. At time of intake C is open and is slowly closing, permitting opening of admission port to cylinder and to check valve B⁴. Air is drawn into cylinder by the suction effect of piston on its downstroke.

In Fig. 11 it is assumed that a compressed charge has been trapped in the cored space of valve C, that is closed, as shown. The piston moves downward, drawing in a fuel charge through operable valve A⁸. When piston has reached a point corresponding to that shown in Fig. 10, A⁸ closes and valve C oscillates quickly, uncovering port C⁵. The air charge previously compressed is released and combines with the fuel charge, ignition taking place by reason of the high temperature of the compressed charge. Power is developed through the remainder of downstroke. On return stroke valve C remains open and the burned charge is exhausted through operable valve B². On downstroke of piston a fresh charge of air is drawn in through valve B⁴. On succeeding upstroke this charge is compressed. During this period valve C is slowly closing. At end of upstroke of piston it has entirely closed, the compressed charge of air being thus trapped. To minimize clearance area above piston I preferably use a lug, D, that approximately fits the space of the opening to valve C, Figs. 9, 10. On next downstroke of piston operable valve A⁸ opens and a fuel charge is drawn in until piston has reached a point corresponding, approximately, to that shown in Fig. 10. Valve C opens quickly, again releasing the contained compressed charge. In Figs. 5, 7, the quick action of the controlling cam is shown at E.

In Fig. 6 I show a diagram of the cycle when using the modification I have just described.

Ignition may be effected by the heat of the compressed charge, or by conventional electrical means.

What I believe is new, and ask to have protected by Letters Patent, is—

Claims.

1. In an internal combustion engine, a combustion chamber, an air chamber communicating therewith, a valve between the air chamber and combustion chamber, a valve stem connected therewith, a check valve on said valve stem adapted to control an air intake passage communicating with the said air chamber, means whereby said valve stem may be actuated, an exhaust pipe communicating with said air chamber, a valve between said pipe and chamber, means whereby said valve may be actuated and means whereby fuel may be introduced directly into the combustion chamber.

2. In an internal combustion engine, a combustion chamber, a fuel inlet pipe communicating with said combustion chamber, means whereby the passage-way between said inlet pipe and said combustion chamber may be opened and closed, an air chamber communicating with said combustion chamber, said air chamber having an air intake passage-way and an exhaust passage-way, a valve between said combustion chamber and air chamber, a second valve between said combustion chamber and exhaust and a third valve between said air chamber and said air intake passage-way and means whereby each of the valves may be actuated.

3. In an internal combustion engine, a combustion chamber, a fuel inlet pipe communicating with said combustion chamber, means whereby the passage-way between said inlet pipe and said combustion chamber may be opened and closed, an air chamber communicating with said combustion chamber, said air chamber having an air intake passage-way and an exhaust passage-way, a valve between said combustion chamber and air chamber, a second valve between said combustion chamber and exhaust and a third valve between said air chamber and said air intake passage-way, means whereby each of the valves may be actuated, said means including a shaft, and cams carried by said shaft.

4. In an internal combustion engine, a combustion chamber, a fuel inlet pipe communicating therewith by means of a passage-way, a valve located between said passage-way and said combustion chamber, a valve stem therefor, a rotatable cam adapted to contact with the valve stem and thereby unseat the valve, an air chamber communicating with said combustion chamber, a valve between said air and combustion chambers, a valve stem therefor, a check valve on said valve stem, a rotatable cam adapted to unseat the valve between the air and combustion chambers, an exhaust pipe communicating with said air chamber, a valve between said exhaust pipe and said air chamber, a valve stem therefor, a rotatable cam adapted to unseat the last mentioned valve and means whereby each of the valves will be reseated when the cams do not actuate the valve stems.

In testimony whereof I affix my signature.

ALVAH L. POWELL.